United States Patent [19]

Gustafsson et al.

[11] Patent Number: 5,505,569
[45] Date of Patent: Apr. 9, 1996

[54] CUTTING INSERT FOR GROOVING OPERATIONS

[75] Inventors: Lars-Erik Gustafsson; Jörgen Wiman, both of Sandviken, Sweden

[73] Assignee: Sandvik AB, Sandviken, Sweden

[21] Appl. No.: 141,603

[22] Filed: Oct. 27, 1993

[30] Foreign Application Priority Data

Oct. 27, 1992 [SE] Sweden .................. 9203133

[51] Int. Cl.$^6$ .................................. B26D 1/12
[52] U.S. Cl. ............................ 407/113; 407/42
[58] Field of Search ............... 407/42, 113, 114, 407/115, 116

[56] References Cited

U.S. PATENT DOCUMENTS

| | | | |
|---|---|---|---|
| 4,320,996 | 3/1982 | Roos | 407/113 |
| 4,340,325 | 7/1982 | Gowanlock | 407/117 |
| 4,512,689 | 4/1985 | Bylund | 407/113 |
| 4,575,888 | 3/1986 | Muren | 407/113 |
| 4,669,925 | 6/1987 | Lowe et al. | 407/113 |
| 4,679,968 | 7/1987 | Tsujimura et al. | 407/113 |
| 4,755,085 | 7/1988 | Muren et al. | 407/113 |
| 5,007,775 | 4/1991 | Pantzar | 407/113 |
| 5,022,796 | 6/1991 | Pano et al. | 407/113 |
| 5,201,352 | 4/1993 | Hult | 407/113 |
| 5,332,338 | 7/1994 | Satran et al. | 407/113 |

*Primary Examiner*—Bruce M. Kisliuk
*Assistant Examiner*—Eileen P. Morgan
*Attorney, Agent, or Firm*—Burns, Doane, Swecker & Mathis

[57] ABSTRACT

The present invention provides an indexable insert for grooving operations, the basic form of which is triangular, the insert comprises extensions in each cutting corner. Each extension has a cutting edge which intersects with two converging edges. The extensions may have a symmetrical or non-symmetrical configuration. The top surface of the extension provides a rake face in regard to the cutting edge and a clearance face of the cutting edge is oriented in the direction of the thickness of the insert.

14 Claims, 2 Drawing Sheets

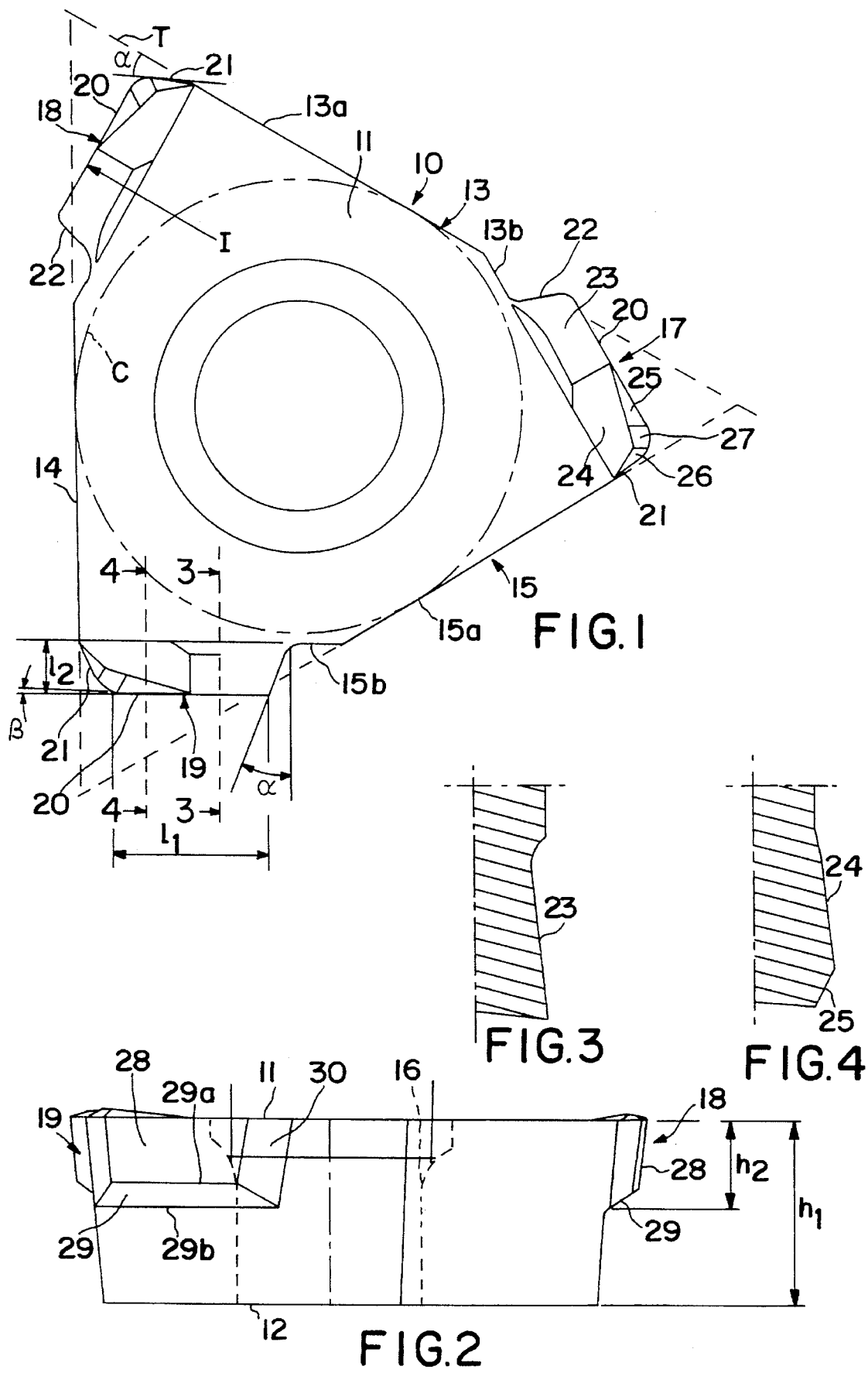

CUTTING INSERT FOR GROOVING OPERATIONS

BACKGROUND AND SUMMARY OF THE PRESENT INVENTION

The present invention relates to an indexable insert for grooving operations, the basic form of which is triangular and which incorporates a top surface, a plane parallel bottom surface and a number of edge surfaces connecting the top and bottom surfaces. Each corner position of the insert has an extension carrying a cutting edge. Those edges that extend towards the cutting edge of the extension converge towards the edge. The extension could be symmetrical or unsymmetrical in its shape.

Available triangular indexable inserts for grooving have a shape that demands a relatively large amount of cemented carbide compared to the useful cutting edge length. This carbide material is expensive and it is therefore of economic advantage to try to reduce the material necessary for each useful cutting edge. It is also desirable to be able to use inserts of such triangular shape so that they match the standard type holders for polygonal indexable inserts and that such inserts have a shape that enables their usage together with other inserts.

Therefore, one object of the present invention is to shape an indexable insert such that a relatively limited mount of hard material is required and at the same time to provide an insert that fits into a standard type toolholder.

It is another object of the present invention to provide an insert such that it becomes suitable for grooving in a holder which also carries an insert for cut-off in a direction mainly perpendicular from the grooving direction of the indexable insert according to the present invention.

BRIEF DESCRIPTION OF THE DRAWINGS

The invention will now be described in more detail by reference to the attached drawings, wherein like members bear like reference numerals, and wherein:

FIG. 1 is a plan view of the insert of the present invention;

FIG. 2 is a side view of the insert;

FIG. 3 is a section view taken along the line 3—3 in FIG. 1;

FIG. 4 is a,sectional view taken along the line 4—4 in FIG. 1;

DETAILED DESCRIPTION OF THE PREFERRED EMBODIMENT

Figure 5:
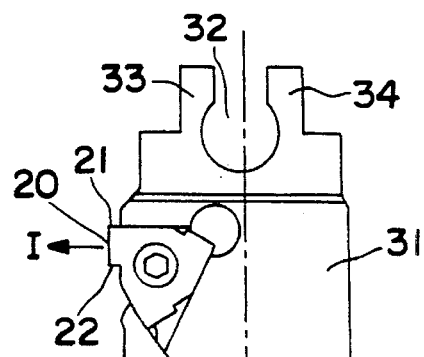
FIG. 5 is a view of a portion of a tool, in plan view, equipped with an insert according to the present invention for grooving.

An insert 10 according to the invention is shown in FIGS. 1, 2 and 3. The insert comprises an upper surface 11, a plane parallel opposite bottom surface 12 and three identical side surfaces 13, 14, 15 intersecting the upper and bottom surfaces. The insert has a central aperture 16 for the receipt of a suitable clamp device whereby the aperture extends substantially perpendicularly from said upper and bottom surface. The insert is in each corner provided with an extension 17, 18, with each extension having a cutting edge 20. Side edges 21, 22 converge towards the corner and extend to the cutting edge 20. The side edge 21 extends at an angle $\alpha$, and the side edge 22 extends at the same angle, in relation to a line parallel with the grooving direction I. In an alternative embodiment, the side edge 21 could extend substantially parallel with the grooving direction I. As another alternative embodiment, the side edges 21, 22 could be oriented at different acute angles from the grooving direction.

The side surfaces 13, 14, 15 intersect with the upper surface 12 at an obtuse angle. A surface portion 13a constitutes one portion of a side of an imaginary triangle "T" defined by a circle "C" inscribed therein with its center coinciding with the center of the insert 10. As a consequence thereof, the surface portion 13a becomes a tangential line to the circle "C" whereas its adjacent surface portion 13b is located at a distance beyond the circle "C". The cutting edge 20 extends substantially parallel with the surface portion 13b. Each extension is located outside the triangle "T" in its entirety, whereby all three sides of the triangle represent tangential lines of the circle "C".

Each extension 17, 18, 19 is confined by an upper surface 23 that is inclined and located somewhat below the plane of the upper surface 11 and by a first bevelled face 24 which is raised in relation to the upper surface 11. The surface 11 is inclined in similarity with the surface 23. This bevelled face 24 is a portion of a raised protrusion which is otherwise confined by two other downwards inclined bevelled faces 25 and 26 and a third bevel face 27 therebetween oriented at obtuse angles from the second bevelled faces 25, 26. The second bevelled face 25 forms an obtuse angle at its intersection with the cutting edge 20. Each of the extensions 7, 18, 19 is furthermore confined by a number of side surfaces 28, 29, 30. The surface 28 provides the clearance face of the cutting edge 20 and the surfaces 29 and 30 intersect with the clearance face 28 at an obtuse angle. The edges 29a, 29b of the surface 29 extend substantially parallel with the cutting edge 20 whereas the surface 30 that joins the surface 28 extends at an angle of 60°–90° in relation to the cutting edge 20.

In the illustrated embodiment, the angle $\alpha$ between the edge 22 and the grooving direction I is about 15°. The angle $\alpha$ should normally be in the range 235°, preferably 10°–30°. By this arrangement, no undesired edge formation is obtained. The length $L_1$ of the cutting edge 20 is in the illustrated embodiment substantially one third of the diameter of the circle C. In cooperation with this ratio, it has been found suitable that the grooving depth of extension 17, 18, 19, i.e., the length $L_2$, amounts to about 30–40% of the length of the cutting edge 20. Also, it is suitable to provide the size of the extension such that the height $h_2$ amounts to 20 to 100%, preferably 30–50% of the entire height $h_2$ of each side surface 13, 14, 15. In one preferred embodiment, the extension has such dimensions that its forward inner corner portion, which defines the extension of the edge 22 becomes a tangential line in relation to the triangle T. Further, it has been found preferable to provide the cutting edge 20 of the extension such that it extends at an acute angle $\beta$ in relation to a line that extends perpendicularly from the grooving direction I. The angle $\beta$ should normally have a value in the range of 0.5° to 2°.

Figure 6:
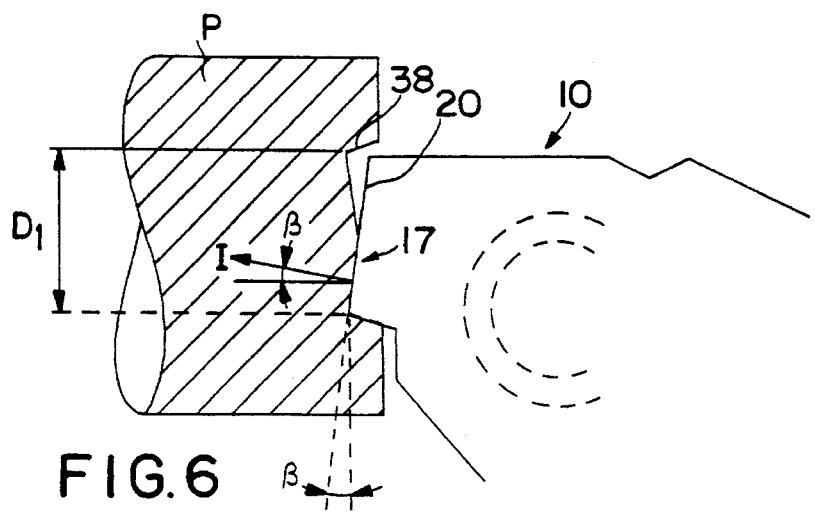
FIG. 6 is a view of the tool in engagement with a workpiece.
Figure 7:
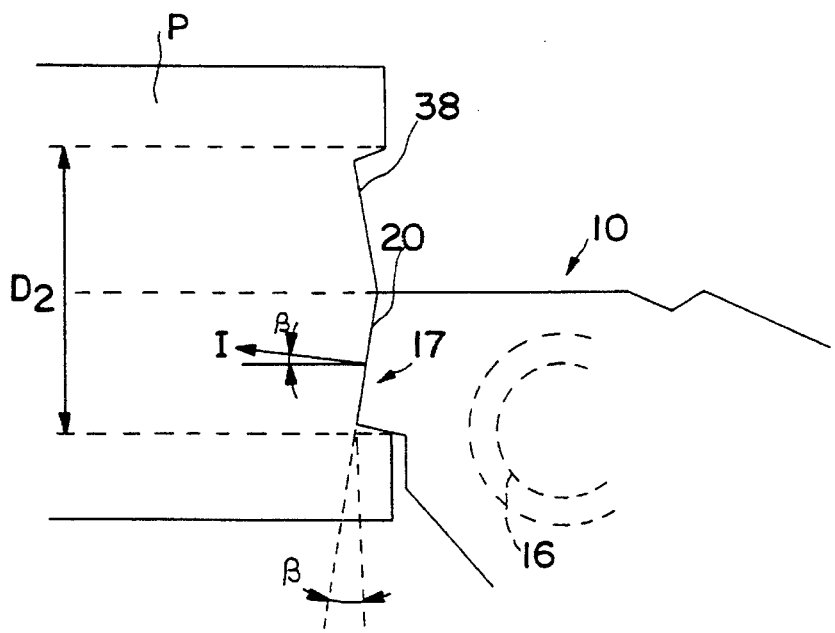
FIG. 7 is a view of the tool in engagement with another workpiece.

With reference to FIG. 5, a tool holder 31 is equipped with a laterally extending insert 10, according to the invention, located on one side of the symmetrical axis CL. The rear portion of the holder is provided as a securing device having a groove 32. The entrance of the rear portion is narrowed using two protrusions 33, 34. The insert 10 is secured by a central locking screw which is threadably engaged in the holder 31. In this way, the insert 10 is provided to be used as a grooving insert acting in the grooving direction I. The grooving direction I is preferably arranged at a certain small angle β with reference to the central axis of a cylindrical workpiece P as shown in FIGS. 6 and 7. This arrangement enables, for instance, to make a cut-off operation without changing tools, of a cylindrical workpiece P after which a grooving operation is performed by the insert 10 in the central portion of the cylindrical workpiece which is a frequently occurring sequence in the mass production of various tooling components in the machining industry.

EXAMPLE

In FIGS. 6 and 7 an embodiment is illustrated where an insert 10 is performing a grooving operation in an end surface of a cylindrical workpiece P. In this illustrated embodiment, an insert has been chosen which has an extension with a cutting edge 20 oriented at an angle β that amounts to 1°. With the embodiment shown in FIG. 6 the diameter $D_1$ of the desired recess 38 is approximately the same as the length of the cutting edge 20, i.e., about 3.5 min. As a consequence of the shape of the insert it is possible to make a chipforming metalworking operation in such a recess without undesirable chip rolling.

With reference to FIG. 7, a metalworking operation with the same insert engages a recess 38 with a diameter $D_2$ of about 6.9 min. In both cases, an improved metalworking operation and improved accessibility is achieved above what would have been possible with presently available inserts. The improved accessibility has been possible primarily due to the shape of the extension 17 as defined herein and in the appended claims.

The principles, preferred embodiments and mode of operation of the present invention have been described in the foregoing specification. However, the invention is not to be limited to the specific embodiments disclosed but is intended to extend to all variations and modifications that fall within the scope of the present invention as defined in the appended claims.

What is claimed is:

1. An indexable cutting insert for grooving operations, comprising:
   a generally triangular plate having three corners and a top and a bottom surface;
   each of the corners having an extension;
   each extension having a cutting edge oriented substantially perpendicular to an adjacent side surface of the insert, the adjacent side surface of the insert being located after the cutting edge, in a clockwise direction, when the insert is viewed from above, each extension having first and second edges which join opposite ends of the cutting edge and converge in a direction of the adjacent side surface toward an outer periphery of the insert;
   each extension having an upper surface including a bevelled face, at least part of the bevelled face being raised above the top surface of the insert; and
   each cutting edge having a clearance surface extending at a height in a direction of thickness of the insert that is equal to or less than a total thickness of the insert.

2. The cutting insert as defined in claim 1, wherein each extension has a clearance face, the clearance face being inclined in relation to the top surface of the insert.

3. The cutting insert as defined in claim 1, wherein each extension is defined, at a bottom edge, by an inclined surface, the inclined surface being oriented at an obtuse angle with respect to the clearance surface, and a portion of the adjacent side surface extends parallel with the cutting edge and defines an end of the first edge of the extension.

4. The cutting insert as defined in claim 1, further comprising a central aperture for receiving a clamping device, the aperture extending in a direction perpendicularly to the top and bottom surfaces of the insert.

5. The cutting insert as defined in claim 1, wherein the extension has a height in the direction of the thickness of the insert which is 30–50% of the total thickness of the insert.

6. The cutting insert as defined in claim 1, wherein the upper surface of the extension includes a surface portion which is located below a plane of the top surface of the insert.

7. The cutting insert as defined in claim 1, wherein a length of the extension, measured in the direction parallel to the adjacent side surface, is 30–40% of a length of the cutting edge.

8. The cutting insert as defined in claim 1, wherein the first edge is oriented at a first edge angle relative to the direction parallel to the adjacent side surface and the second edge is substantially parallel to the direction parallel to the adjacent side surface.

9. The cutting insert as defined in claim 8, wherein the first edge angle is 10° to 30°.

10. The cutting insert as defined in claim 1, wherein an imaginary triangle inscribing the insert is tangent to an inner corner of at which the second edge and the cutting edge meet.

11. The cutting insert as defined in claim 1, wherein the bevelled face includes bevel surfaces inclined downwardly in a direction toward the outer periphery of the insert, at least one of the bevel surfaces meeting with the cutting edge and and defining an obtuse angle therewith, and at least another one of the bevel surfaces meeting with the second side edge and defining an obtuse angle therewith.

12. The cutting insert as defined in claim 1, wherein the bevelled face is defined by a first surface inclined upwardly in a direction toward an outer periphery of the insert, and, meeting the first surface at an outer edge thereof, two downwardly inclined outer bevelled surfaces, and a downwardly inclined inner bevelled surface, the inner bevelled surface defining obtuse angles relative to each of the outer bevelled surfaces.

13. An indexable cutting insert for grooving operations, comprising:
   a generally triangular plate having three corners and a top and a bottom surface;
   each of the corners having an extension;
   each extension having a cutting edge oriented at a cutting edge angle to a line that is substantially perpendicular to an adjacent side surface of the insert, the adjacent side surface of the insert being located after the cutting edge, in a clockwise direction, when the insert is viewed from above, each extension having first and second edges which join opposite ends of the cutting edge and converge in a direction of the adjacent side surface;
   each extension having an upper surface including a bevelled face, at least part of the bevelled face being raised above the top surface of the insert; and
   each cutting edge having a clearance surface extending at a height in a direction of thickness of the insert that is equal to or less than a total thickness of the insert.

14. The cutting insert as defined in claim 13, wherein the cutting edge angle is 0.5° to 2°.

* * * * *